United States Patent [19]

Smith et al.

[11] 3,877,643
[45] Apr. 15, 1975

[54] METHOD AND APPARATUS FOR REMOVING RUBBER COATING FROM AIRPORT RUNWAYS

[76] Inventors: Roderick William Smith, 730 Glenleven Cres., Mississauga, Ontario; Robert George McEwen, 1137 Manning Cres., Fort Erie, Ontario; Douglas Leslie Fraser, 689 Marley Rd., Burlington, Ontario, all of Canada

[22] Filed: Oct. 24, 1972

[21] Appl. No.: 300,214

[30] Foreign Application Priority Data
June 27, 1972 Canada ................................ 145771

[52] U.S. Cl. ................. 239/102; 239/160; 239/287
[51] Int. Cl. .............................................. B05b 9/02
[58] Field of Search ........... 239/159, 160, 161, 164, 239/186, 286, 287, 146, 102; 134/19, 38, 34

[56] References Cited
UNITED STATES PATENTS

| | | | |
|---|---|---|---|
| 2,722,453 | 11/1955 | Moore | 239/160 X |
| 3,199,423 | 8/1965 | Dickey | 239/159 X |
| 3,353,748 | 11/1967 | Harris | 239/161 X |
| 3,709,436 | 1/1973 | Foster | 239/287 |
| 3,726,481 | 4/1973 | Foster et al. | 239/287 |

FOREIGN PATENTS OR APPLICATIONS

| | | | |
|---|---|---|---|
| 587,698 | 1/1959 | Italy | 239/160 |

*Primary Examiner*—M. Henson Wood, Jr.
*Assistant Examiner*—Michael Mar
*Attorney, Agent, or Firm*—Fetherstonhaugh & Co.

[57] ABSTRACT

An improved method of removing the rubber coating deposited on the surface of an airport runway by the tires of an aircraft comprises the steps of forming a plurality of solid stream 0° to 15° streams of high velocity water in a closely adjacent parallel relationship, directing the streams to impinge on a surface to be cleaned at an angle of 0° to 35° to the vertical plane, and moving the streams longitudinally of the surface to be cleaned while simultaneously transversely reciprocating the streams a distance at least equal to the transverse distance between adjacent streams. The apparatus consists of a spray conduit having a plurality of solid stream 0° nozzles mounted thereon and means for reciprocally driving the conduit longitudinally of itself a distance at least equal to the longitudinal distance between adjacent nozzles.

3 Claims, 5 Drawing Figures

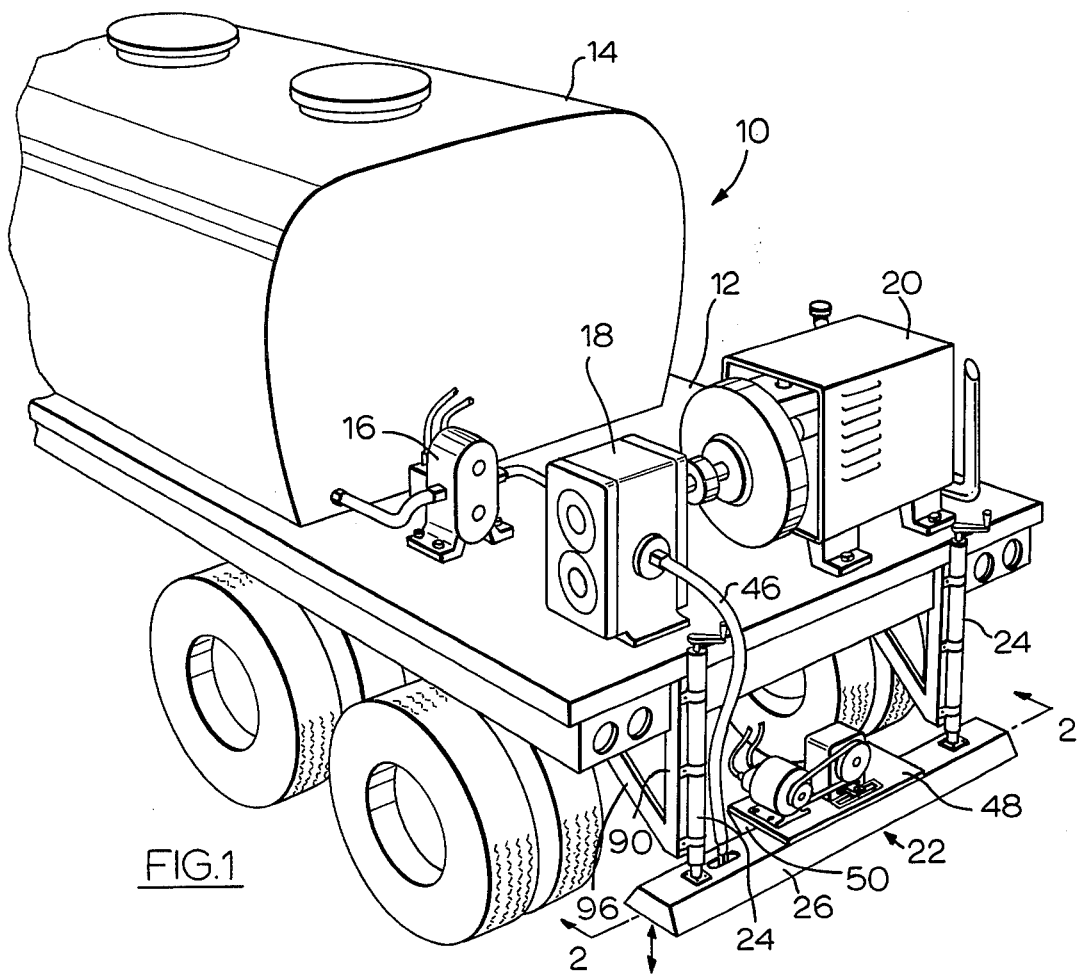
FIG.1
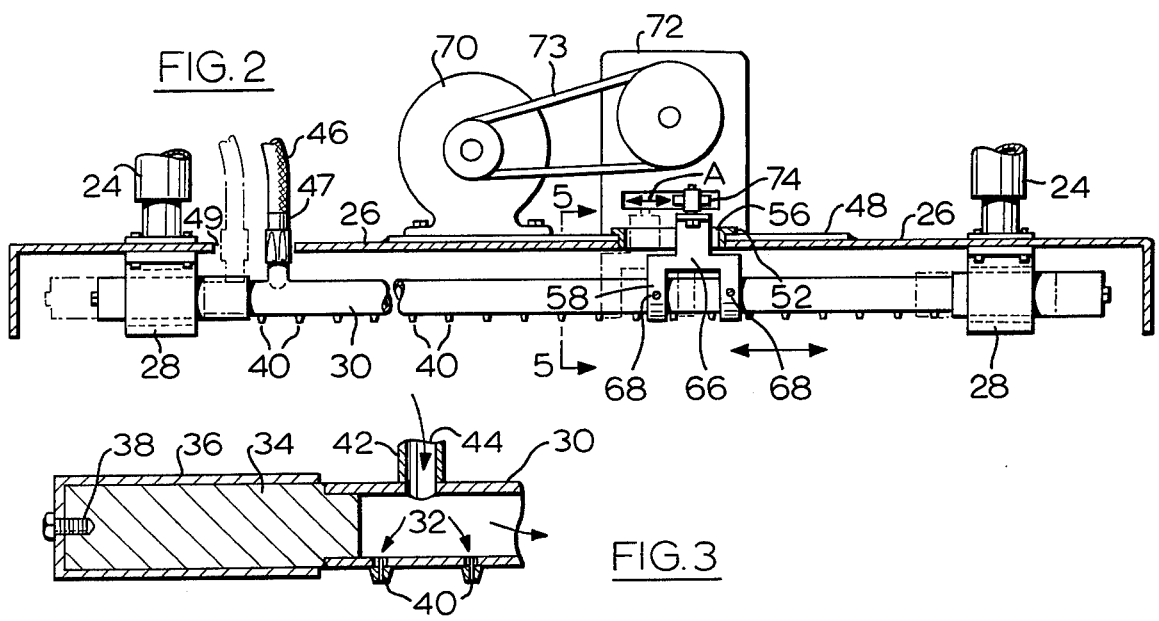
FIG.2
FIG.3

METHOD AND APPARATUS FOR REMOVING RUBBER COATING FROM AIRPORT RUNWAYS

This invention relates to an improved method and apparatus for removing the rubber coating deposited on surface of an airport runway by the tires of an aircraft.

A considerable amount of rubber is deposited on an airport runway by the tires of aircraft during landing and take off. The rubber coating is a hazard to aircraft, particularly when wet as it makes the surface of the runway very slippery. Numerous attempts have been made to provide a method and apparatus for effectively removing the rubber coating from the surface of a runway and to date the only effective method which has been developed requires the rubber coated surface to be treated with a chemical composition which attacks the rubber. Due to the fact that some considerable time is required in order to permit the chemical reaction to be complete before mechanically scraping the residue from the surface of the runway, this operation requires the runway to be out of use for a period of several days. The removal from use of a major runway from a major airport for several days considerably increases the traffic load on the remaining runways with the result that the congestion at major airports is further increased. The cost of the chemicals required for the removal of the rubber coating is also a substantial factor in the overall cost of the cleaning operation.

A further problem encountered in the use of a chemical cleaning composition is the environmental pollution caused by the proportion of the chemicals which drain from the runway to the runway drainage systems and surrounding soil.

The present invention overcomes the difficulties of the prior art described above and provides a simple and efficient method and apparatus for removing the coating of rubber deposited on the surface of an airport runway by means of a high velocity water spray.

According to an embodiment of the present invention, there is provided a method for removing the rubber coating deposited on the surface of a runway of an airport by the tires of an aircraft comprising the steps of forming a plurality of solid stream 0° to 15° streams of high velocity water in a closely adjacent parallel relationship, directing the streams to impinge on the surface to be cleaned at an angle in the range of 0° to 35° to the vertical plane and moving the streams longitudinally of the surface to be cleaned while simultaneously transversely reciprocating the streams a transverse distance at least equal to the transverse distance between the adjacent streams.

According to a further embodiment of this invention, there is provided an apparatus for removing the rubber coating deposited on the surface of an airport runway by the tires of an aircraft comprising a spray conduit, a plurality of solid stream 0° nozzles mounted on and spaced longitudinally of said conduit to form a plurality of parallel side by side discharge passages opening from said conduit, input passage means opening into said conduit and connectable to a source of high pressure water, means for mounting said conduit on a movable vehicle so as to direct the discharge of the nozzles to impinge onto the surface to be cleaned at an angle in the range of 0° to 35° to the vertical plane, and means for reciprocally driving the conduit longitudinally of itself a distance at least equal to the longitudinal distance between adjacent nozzles.

The invention will be clearly understood after reference to the following detailed specification read in conjunction with the drawings, wherein:

FIG. 1 of the drawings is a pictorial view of a trailer with a cleaning assembly according to an embodiment of the present invention mounted thereon;

FIG. 2 is a sectional view of a spray bar assembly in the direction of the arrow 2—2 of FIG. 1;

FIG. 3 is a sectional view of the end of the spray bar units at which the input fluid line is connected;

Figure 4:
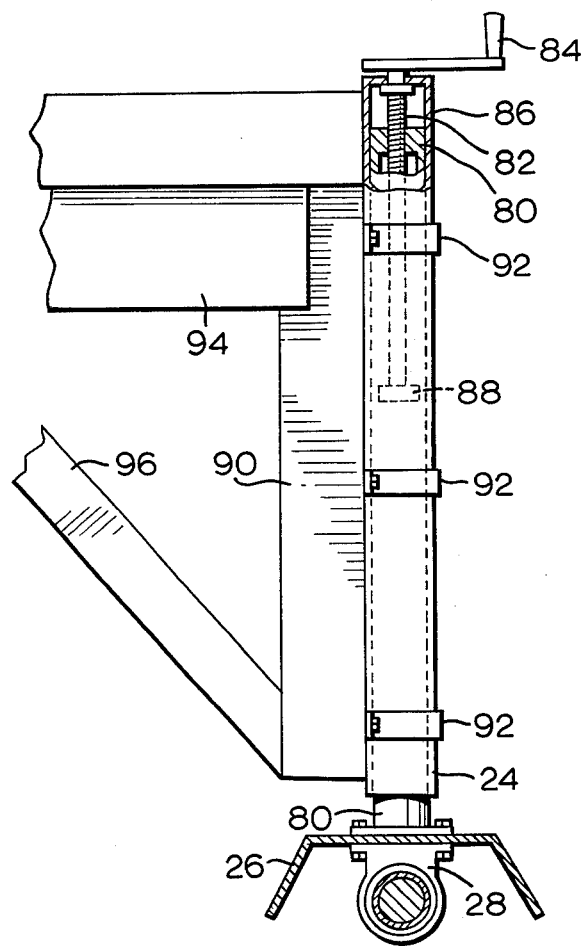
FIG. 4 is a partially sectioned end view illustrating the manner in which the spray bar is mounted on the frame of the vehicle.

With reference to the drawings, the reference numeral 10 refers generally to an apparatus for use in the removal of rubber from airport runways and the like. The apparatus 10 includes a vehicle trailer body 12 with a sotrage tank 14, feed pump 16, main pump 18, motor 20 and spray bar assembly 22.

The spray bar assembly 22 consists of a pair of manually operable jacks 24 having a spray canopy 26 and a bearing lock 28 mounted at the lower end thereof (FIG. 2). A spray conduit 30 has a central passage 32 which is closed at either end by a plug 34 (FIG. 3) which is welded thereto. A removable sleeve 36 fits in close fitting relationship over the outer surface of the plug 34 and is held in position by a locking screw 38. The sleeve 36 is proportioned to fit in a close fitting sliding relationship within the bearing housing 28. The sleeve 36 is provided so that the sleeve 36 will wear as a result of reciprocation of the spray bar and it will only be necessary to replace the sleeve 36 in order to recondition the spray bar. The spray bar 30 has a plurality of solid stream 0° to 15° nozzles preferably 0° nozzles spaced longitudinally of the conduit and communicating with the central passage 32 thereof. The nozzles 40 are spaced apart a distance which is less than the length of the path of travel of the spray bar as it reciprocates. An input conduit 42, having an input passage 44, opens into the chamber 32 and is connected to high pressure feed hose 46 by means of a conventional coupling.

Figure 5:
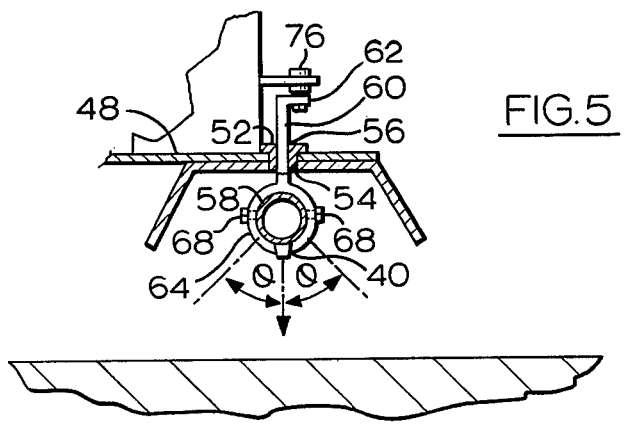
FIG. 5 is a sectional view in the direction of the arrow 5—5 of FIG. 3.

A platform 48 is mounted on the upper face of the canopy 26 and braced against the inner side wall of the canopy by means of webs 50. A bearing plate 52 is mounted in a passage 54 formed in the platform 48 and the upper face of the canopy 26. A rectangular passage 56 is formed in the bearing plate. A bracket 58 (FIG. 2 and 5) is mounted to reciprocate within the passage 56 formed in the bearing plate 58. The bracket 58 consists of a vertically extending arm 60 having a flange 62 at the upper end thereof and a pair of sleeve portions 64 connected by a transverse extension 66. Clamping screws 68, extend through the sleeve portion 64 and rigidly clamp the bracket 58 to the conduit 30.

The hydraulic motor 70 and an oscillator 72 are mounted on the platform 48 and drivingly connected by drive belt 73. In use, the hydraulic motor 70 drives the oscillator 72 so as to cause the oscillator arm 74 to reciprocate to and fro in the direction of the arrow A. The oscillator arm 74 is connected to the flange 62 of the bracket 58 by means of a slidably mounted coupler 76 which permits the arcuate movement of the oscillator arm 74 to be translated to a linear movement of the bracket 58 in use.

As previously indicated, the canopy 26 and bearings 28 are mounted on the lower ends of manually adjustable jacking devices 24. With reference to FIG. 4 of the drawings, it will be seen that the canopy 26 and bearing 28 are, in fact, mounted on the lower end of the shaft 80, the upper end of which is threadably mounted on the crankshaft 82. A crank arm 84 may be manually rotated to drive the shaft 80 upwardly or downwardly within the housing 86, with the lower limit of travel being determined by the stop 88 which is mounted on the end of the threaded shaft 82. The jacking devices 24 are mounted on vertical posts 98 by means of a plurality of brackets 92. The vertical posts 98 extend downwardly from the frame 94 of the vehicle at the rear end of the vehicle and they are braced by angularly inclined struts 96. The position of the spray bar relative to the surface to be cleaned may be adjusted by rotating the crank handles 84. The angle of inclination $\theta$ of the nozzles 40 relative to the vertical plane may be adjusted by releasing the clamping screws 68 (FIG. 5) and simply rotating the spray bar relative to the bracket 58 and bearings 28. It has been found that in use the angle of inclination $\theta$ is within the range of 0° to 35° and preferably within the range of 15° to 30° in the direction of travel of the vehicle. The coupling 47 which connects the hose 46 to the conduit 44 is adapted to permit the angular adjustment of the spray bar and the passageway 49 formed in the canopy 26 to receive the coupling 47 is elongated to permit the coupling to reciprocate with the spray bar.

The hydraulic motor 70 and feed pump 16 are driven by hydraulic fluid supplied by the conventional hydraulic circuit provided in most truck assemblies. If the truck is not equipped with the hydraulic drive circuit, then a separate pump and reservoir may be mounted on the trailer in the space provided at the rear of the storage tank.

In use, the storage tank 14 is filled with water, the feed pump 16 supplies water to the main pump 18 which is driven by the diesel engine 20. The main pump 18 supplies water to the spray bar by way of the conduit 46 which is subsequently discharged through the nozzles 40 in a plurality of side by side parallel streams. Simultaneously the hdyraulic motor 70 drives the oscillator 72, which in turn reciprocally drives the spray bar 30. The vehicle moves along the surface of a runway directing the streams of water onto the surface at an angle of about 0° to 35° to the vertical, in the direction of travel of the vehicle, while continuously reciprocating the spray bar.

A suitable feed pump for use in the apparatus of the present invention is manufactured by Monarch Machinery and identified by the trade mark ZOIGP and has a capacity of 173 G.P.M. at 1,750 R.P.M. A suitable high pressure pump 18 is manufactured by F W I, Inc. (Tulsa) and identified by the trade mark HP 250H and has a capacity of 65 U.S.G.P.M. at 6,500 P.S.I. A suitable diesel engine 20 is manufactured by Detroit Deisel and is identified by the trade mark Series 8 v71 and has a power output of about 250 H.P.. In order to obtain the required velocity and volume of discharge the pressure of water at the nozzle should be within the range of 4,000 to 8,000 P.S.I. An oscillator suitable for use in the present invention ismanufactured by International Harvester Limited and identified by the trade mark 110 MOWER.

It has been found that in order to effectively clean an airport runway, the system should be capable of discharging a plurality of solid stream 0° streams of water having a velocity in the range of about $13 \times 10^4$ feet per second. The total volume of water discharged through each stream is preferably in the range of .02 cubic feet per second. The longitudinal speed of travel of the streams relative to the runway surfaces is preferably in the range of 2.0 feet per second and the transverse reciprocating speed is preferably in the range of 1.5 to 2.0 feet per second.

From the foregoing it will be apparent that the present invention provides a simple and inexpensive method and apparatus for cleaning airport runways which overcomes many of the difficulties of the prior art described above. In particular, the cost of providing cleaning chemicals has been eliminated by the use of water and, in addition, it is no longer necessary to remove a runway from service for any great length of time. The time required to clean the runway surface will depend upon the amount of rubber deposited on the runway, and the number of vehicles used to clean the runway. The speed of travel of each vehicle is controlled by the amount of rubber which is to be removed.

A further advantage of the method of the present invention is that the use of water in the cleaning of the runway surface does not add to the pollution of the environment as does the use of a chemical cleaning agent.

These and other advantages of the present invention will be apparent to those skilled in the art.

The embodiments of the invention in which an exclusive property or privilege is claimed are defined as follows:

1. An apparatus for removing the rubber coating deposited on the surface of an airport runway by the tires of an aircraft comprising
   a spray conduit;
   b. a plurality of solid stream 0° to 15° nozzles mounted on and spaced longutidinally of said conduit to form a plurality of parallel side by side discharge passages opening from said conduit;
   c. input passage means opening into said conduit and connectable to a source of high pressure water;
   d. means for mounting said conduit on a movable vehicle so as to direct the discharge of the nozzles to impinge onto the surface to be cleaned at an angle in the range of 0° to 35° to the vertical plane and
   e. means for reciprocally driving said conduit longitudinally of itself a distance at least equal to the longitudinal distance between adjacent nozzles.

2. An apparatus as claimed in claim 1 wherein said means for mounting said conduit includes a pair of bushes disposed at either end of said conduit, said conduit being adapted to reciprocate in said bushes.

3. An apparatus as claimed in calim 1 wherein said means for reciprocally driving said conduit includes an oscillator and motor means for driving said oscillator.

* * * * *